(12) United States Patent
Roh et al.

(10) Patent No.: US 9,209,463 B2
(45) Date of Patent: Dec. 8, 2015

(54) SECONDARY BATTERY AND METHOD OF FABRICATING OF THE SECONDARY BATTERY

(75) Inventors: Sae-Weon Roh, Yongin-si (KR);
Sung-Soo Kim, Yongin-si (KR);
Tae-Keun Kim, Yongin-si (KR);
Jin-Kyu Hong, Yongin-si (KR);
Nam-Soon Choi, Yongin-si (KR);
Jun-Sik Kim, Yongin-si (KR);
Man-Seok Han, Yongin-si (KR);
Chong-Hoon Lee, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 88 days.

(21) Appl. No.: 12/845,576

(22) Filed: Jul. 28, 2010

(65) Prior Publication Data

US 2011/0217588 A1 Sep. 8, 2011

Related U.S. Application Data

(60) Provisional application No. 61/310,627, filed on Mar. 4, 2010.

(51) Int. Cl.
| | |
|---|---|
| *H01M 2/02* | (2006.01) |
| *H01M 4/82* | (2006.01) |
| *H01M 4/62* | (2006.01) |
| *H01M 10/04* | (2006.01) |
| *H01M 10/42* | (2006.01) |

(52) U.S. Cl.
CPC .......... *H01M 4/62* (2013.01); *H01M 10/0436* (2013.01); *H01M 10/4235* (2013.01); *Y02E 60/122* (2013.01); *Y10T 29/49108* (2015.01)

(58) Field of Classification Search
CPC  H01M 4/62; H01M 10/0436; H01M 10/4235
USPC .......................................... 429/163; 29/623.1
See application file for complete search history.

(56) References Cited

U.S. PATENT DOCUMENTS

| | | | |
|---|---|---|---|
| 6,383,234 B1 | 5/2002 | Noh | |
| 6,524,738 B1 | 2/2003 | Lee et al. | |
| 7,189,478 B2 * | 3/2007 | Iijima et al. | ............... 429/231.95 |
| 2005/0084753 A1 | 4/2005 | Kim | |
| 2005/0266305 A1 | 12/2005 | Ohata et al. | |

(Continued)

FOREIGN PATENT DOCUMENTS

| | | |
|---|---|---|
| EP | 0959513 A1 | 11/1999 |
| EP | 1020943 A1 | 7/2000 |

(Continued)

OTHER PUBLICATIONS

Extended European search Report in corresponding Application No. 10172888.9-2119, dated Dec. 6, 2010, 8 pages.

(Continued)

*Primary Examiner* — Karie O'Neill Apicella
(74) *Attorney, Agent, or Firm* — Knobbe Martens Olson & Bear LLP

(57) ABSTRACT

Disclosed is a secondary battery which includes an electrode assembly comprising inner stacked electrodes and at least one outermost electrode positioned on at least one end of the inner stacked electrodes; and a case configured to house the electrode assembly. Herein, the at least one outermost electrode comprise an inactive material.

20 Claims, 3 Drawing Sheets

(56) References Cited

U.S. PATENT DOCUMENTS

2007/0072062 A1    3/2007   Fukui et al.
2007/0231684 A1   10/2007   Takano et al.
2009/0065042 A1*   3/2009   Reynolds .................. 136/244
2010/0167124 A1    7/2010   Seo et al.

FOREIGN PATENT DOCUMENTS

| EP | 1496562 A1 | 1/2005 | | |
|---|---|---|---|---|
| JP | 11-307116 | 11/1999 | | |
| JP | 2000-299133 | 10/2000 | | |
| JP | 2001-176497 | 6/2001 | | |
| JP | 2003-257496 A | 9/2003 | | |
| JP | 2006-173138 | 6/2006 | | |
| JP | 2006-228544 A | 8/2006 | | |
| JP | 2006228544 A | * | 8/2006 | ............ H01M 4/02 |
| JP | 2009-527090 A | 7/2009 | | |
| JP | 2009-199912 | 9/2009 | | |
| JP | 2010-040489 | 2/2010 | | |
| JP | 2010-123357 | 6/2010 | | |
| JP | 2011-048932 | 3/2011 | | |
| KR | 1020020023492 | 3/2002 | | |
| KR | 102006011177 | * | 5/2007 | ............ H01M 10/38 |
| KR | 1020070053614 | 5/2007 | | |
| KR | 1020070060023 | 6/2007 | | |
| KR | 1020070082579 | 8/2007 | | |
| KR | 1020080010166 | 1/2008 | | |
| WO | WO2005/117169 A1 | 12/2005 | | |

OTHER PUBLICATIONS

Chinese Second Office Action dated Dec. 30, 2013, issued in connection with corresponding Chinese Patent Application No. 201110040234.5.

JPO Office Action issued by the Japanese Patent Office dated Dec. 4, 2012, 3 pages.

Office Action issued on Apr. 28, 2013 by the Chinese Patent Office in connection with Chinese Patent Application No. 201110040234.5.

Chinese Third Office Action dated Jul. 10, 2014, issued in connection with corresponding Chinese Patent Application No. 201110040234.5.

Office Action issued Jan. 23, 2015, in corresponding CN Application No. 201110040234.5.

\* cited by examiner

SECONDARY BATTERY AND METHOD OF FABRICATING OF THE SECONDARY BATTERY

CROSS-REFERENCE TO RELATED APPLICATION

This application claims priority to U.S. Provisional Application No. 61/310,627, filed on Mar. 4, 2010 which is incorporated herein in its entirety.

BACKGROUND

1. Field

This disclosure relates to a secondary battery and method of fabricating of the secondary battery.

2. Description of the Related Technology

Batteries convert chemical energy generated from an electrochemical redox reaction of a chemical material in the battery into electrical energy. Such batteries may be classified into a primary battery, which should be disposed after the energy inside the battery is consumed, and a secondary battery, which may be recharged more than once. The secondary battery may be charged/discharged more than one time based on the reversible transformation between chemical energy and electrical energy. Recent development in high-tech electronics industry allows electronic devices to become small and light in weight, which has lead to an increase in portable electronic devices. As a power source for such portable electronic devices, the demands for batteries with high energy density are increasing and much research has been directed to developing lithium secondary batteries. The lithium secondary battery includes an electrode assembly having a positive electrode, a negative electrode and a separator interposed between them, and a case for housing the electrode assembly. The electrode assembly may be a stacked electrode assembly with a plurality of positive electrodes, separators and negative electrodes. A stacked electrode assembly may have a deteriorated battery performance due to an abnormal reaction in the outermost portion of an electrode.

SUMMARY OF CERTAIN INVENTIVE ASPECTS

One embodiment of this disclosure provides a secondary battery comprising an electrode assembly comprising inner stacked electrodes and at least one outermost electrode positioned on at least one end of the inner stacked electrodes; and a case configured to house the electrode assembly; wherein the at least one outermost electrode comprise an inactive material.

Another embodiment of this disclosure provides method of fabricating the secondary battery comprising providing an electrode assembly comprising inner stacked electrodes and at least one outermost electrode positioned on at least one end of the inner stacked electrodes; and housing the electrode assembly in a case, wherein the at least one outermost electrode comprises an inactive material.

The at least one outermost electrode may include an inorganic material or an organic material or a combination thereof that does not cause an electrochemical reaction.

The at least one outermost electrode may include a porous inorganic material.

The porous inorganic material may include at least one selected from the group consisting of carbon black, graphite, silica gel, zirconia, alumina, zeolite, ceramic powder and silicon nitride.

The at least one outermost electrode may include a porous organic material.

The porous organic material may include at least one selected from the group consisting of fluoropolymer, fluoroelastomer, perfluoroelastomer, elastomeric bisphenol, epoxy vinylester, vinylester resin, (meth)acrylated novolak-(meth)acrylated epoxy vinylester, hydroxyl-terminated polybutadiene resin, furfuryl alcohol resin, parylene, polyamide, polyimide, and polyphenylene sulphide.

The at least one outermost electrode may include a current collector and an inactive material layer comprising the inactive material formed on one side of the current collector, wherein the inactive material layer contacts the case.

The at least one outermost electrode may further include an active material layer formed on the other side of the current collector.

The inactive material layer may be positioned in either the lower or upper portion of the electrode assembly.

The inactive material layer may be positioned in both the lower and upper portion of the electrode assembly.

The inner stacked electrodes may include a plurality of positive electrodes and negative electrodes alternately stacked, and a separator interposed between each positive electrode and negative electrode.

The positive electrode may include a positive active material comprising a composite oxide including at least one of cobalt, manganese, nickel, and lithium.

The negative electrode may include a negative active material comprising at least one of a material that reversibly intercalates/deintercalates lithium ions, a lithium metal, a lithium metal alloy, a material capable of doping lithium, and a transition metal oxide.

DETAILED DESCRIPTION OF CERTAIN INVENTIVE EMBODIMENTS

Figure 1:
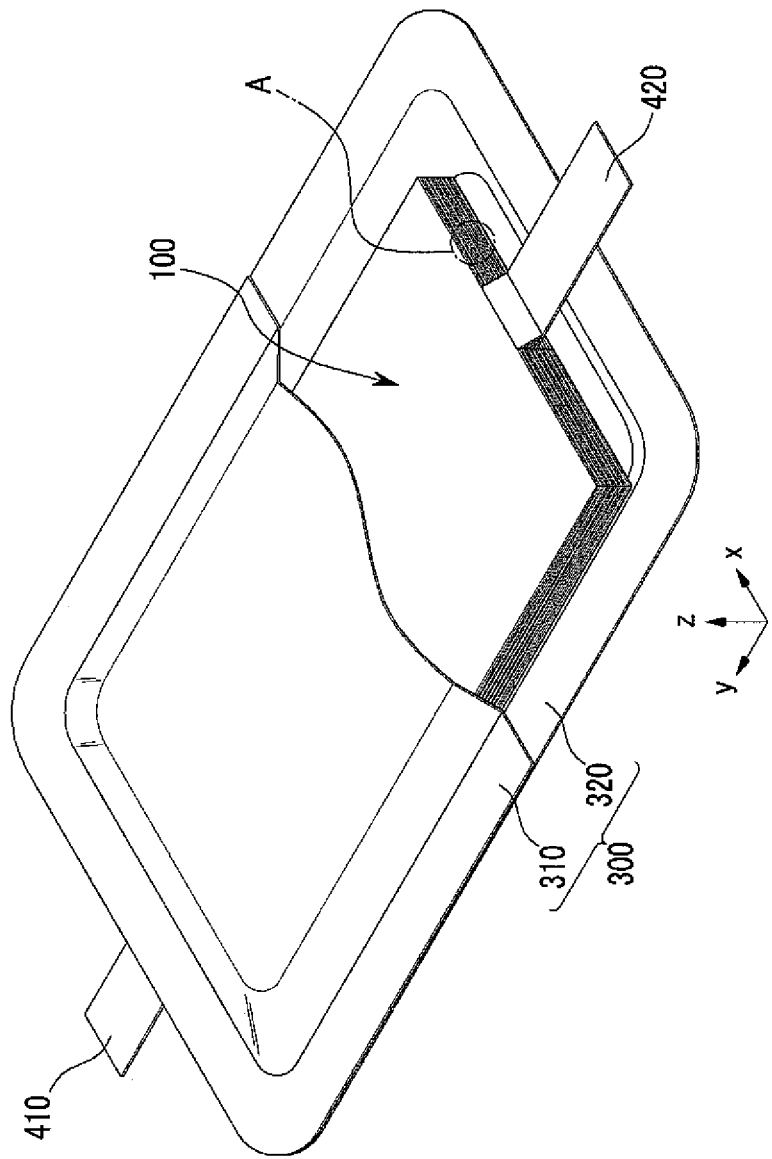
FIG. 1 is a partially cut-away perspective view of a secondary battery according to one embodiment.

This disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present embodiments.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
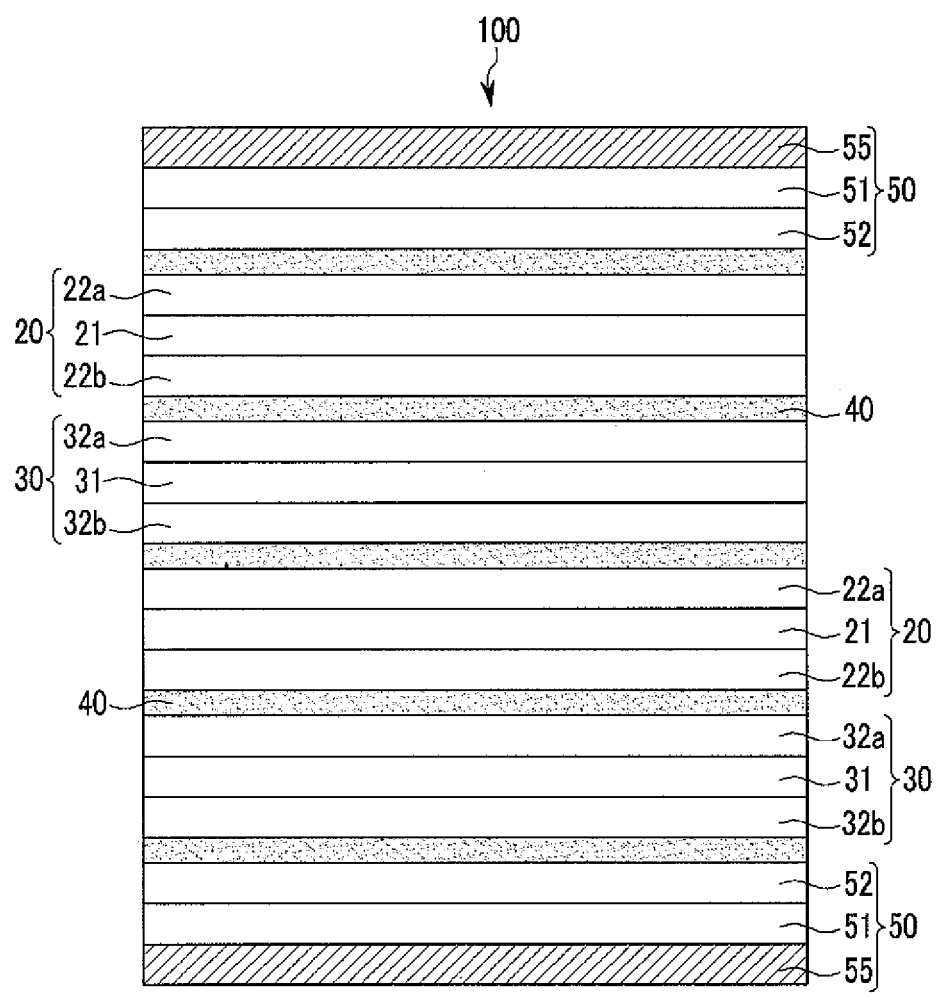
FIG. 2 is a cross-sectional view of one embodiment magnifying an 'A' portion shown in FIG. 1.

Referring to FIGS. 1 and 2, a secondary battery according to one embodiment will be described.

FIG. 1 is a partially cut-away perspective view of a secondary battery according to one embodiment, and FIG. 2 is a cross-sectional view enlarging an 'A' portion shown in FIG. 1.

First, referring to FIG. 1, the secondary battery according to one embodiment includes an electrode assembly 100, a case 300 for housing the electrode assembly 100, and electrode terminals 410 and 420 coupled to the electrode assembly 100 and drawn out to the outside of the case 300.

The case 300 has an internal space for housing the electrode assembly 100 and includes an upper case 310 and a lower case 320 based on the internal space. The upper case 310 and the lower case 320 may comprise, for example, a material, such as laminate sheet, and the electrode assembly 100 which may comprise impregnating electrolyte solution is housed in the internal space and the edges are integrated through heat fusion to thereby hermetically seal the electrode assembly 100. The shape and material of the case 300 are not limited to the above and may be modified diversely.

The electrode terminals 410 and 420 include a positive terminal 410 coupled with a positive electrode 20 and a negative terminal 420 coupled with a negative electrode 30. The drawing shows an example where the positive terminal 410 and the negative terminal 420 are drawn out from both sides of the case 300, but the present embodiments are not limited to it and they may be drawn out in one side.

Referring to FIG. 2, the electrode assembly 100 includes a plurality of electrodes stacked on one another, and the plurality of the electrodes include electrodes positioned in the uppermost and lowermost portions, which are referred to as 'outermost electrodes,' hereinafter, and electrodes stacked between the two outermost electrodes are referred to as 'inner stacked electrodes,' hereinafter.

Herein, the structure of the inner stacked electrodes is different from the structure of the outermost electrodes.

Hereafter, the inner stacked electrodes will be described first.

The inner stacked electrodes includes a plurality of electrodes which are positive electrodes 20 and negative electrodes 30 alternately stacked, and a separator 40 is interposed between a positive electrode 20 and a negative electrode 30. The drawings shows an example where the positive electrode 20, the separator 40 and the negative electrode 30 are sequentially stacked, but the positive electrode 20 may be replaced with the negative electrode 30, and the negative electrode 30 may be replaced with the positive electrode 20. Also, the drawing exemplarily shows two positive electrodes 20, two separators 40 and two negative electrodes 30 are stacked. The present embodiment, however, is not limited to it and more positive electrodes 20, separators 40 and negative electrodes 30 may be stacked.

The positive electrode 20 includes a current collector 21 and positive active material layers 22$a$ and 22$b$ formed on both sides of the current collector 21.

The current collector 21 may be a metal thin film or a net-shaped plate such as mesh. The current collector 21 may comprise, for example, aluminum (Al).

The positive active material layers 22$a$ and 22$b$ may be formed on both sides of the current collector 21, and the thickness of each positive active material layer 22$a$ or 22$b$ may range from about 10 μm to about 10 mm.

The positive active material layers 22$a$ and 22$b$ include a positive active material; a binder and a conductive material.

The positive active material includes compounds that reversibly intercalate and deintercalate lithium ions. The positive active material may include a composite oxide including at least one of cobalt, manganese, and nickel, as well as lithium. In particular, the following lithium-containing compounds may be used. $Li_aA_{1-b}B_bD_2$ (wherein, in the above formula; $0.90 \leq a \leq 1.8$ and $0 \leq b \leq 0.5$); $Li_aE_{1-b}B_bO_{2-c}D_2$ (wherein, in the above formula, $0.90 \leq a \leq 1.8$, $0 \leq b \leq 0.5$, and $0 \leq c \leq 0.05$); $LiE_{2-b}B_bO_{4-c}D_c$ (wherein, in the above formula, $0 \leq b \leq 0.5$, and $0 \leq c \leq 0.05$); $Li_aNi_{1-b-c}Co_bB_cD_\alpha$ (wherein, in the above formula, $0.90 \leq a \leq 1.8$, $0 \leq b \leq 0.5$, $0 \leq c \leq 0.05$, and $0 \leq \alpha \leq 2$); $Li_aNi_{1-b-c}CO_bB_cO_{2-\alpha}F_\alpha$ (wherein, in the above formula, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein, in the above formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein, in the above formula, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein, in the above formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein, in the above formula, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, in the above formula, $0.90 \leq a \leq 1.8$, $0 \leq b \leq 0.9$, $0 \leq c \leq 0.5$, and $0.001 \leq d \leq 0.1$); $Li_aNi_bCO_cMn_dGeO_2$ (wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, in the above formula, $0.90 \leq a \leq 1.8$, and $0.001 \leq b \leq 0.1$); $Li_aCoG_bO_2$ (wherein, in the above formula, $0.90 \leq a \leq 1.8$, and $0.001 \leq b \leq 0.1$); $Li_aMnG_bO_2$ (wherein, in the above formula, $0.90 \leq a \leq 1.8$, and $0.001 \leq b \leq 0.1$); $Li_aMn_2G_bO_4$ (wherein, in the above formula, $0.90 - a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the above formulae, A is selected from the group consisting of Ni, Co, Mn, and a combination thereof; B is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; F is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; I is selected from the group consisting of Cr, V, Fe, Sc, Y, and a combination thereof; and J is selected from the group consisting of V, Cr, Mn, Co, Ni, Cu, and a combination thereof.

The binder improves binding properties of positive active material particles with one another and with a current collector. Examples of the binder include at least one selected from the group consisting of polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include one or more of natural graphite, artificial graphite, carbon black, acetylene black, ketjen black, carbon fiber, metal powder or metal fiber copper of nickel, aluminum, silver and the like, and conductive polymers such as polyphenylene derivatives.

The negative electrode 30 includes a current collector 31 and negative active material layers 32$a$ and 32$b$ formed on both sides of the current collector 31.

The current collector 31 may be a metal thin film or a net-shaped plate such as mesh, for example, the current collector 31 may comprise, for example, copper, nickel, stainless steel, titanium, a polymer substrate coated with a conductive metal or a combination thereof.

The negative active material layers 32$a$ and 32$b$ may be formed on both sides of the current collector 31, and the thickness of each negative active material layer 32a or 32b may range from about 10 μm to about 10 mm.

The negative active material includes a material that reversibly intercalates/deintercalates lithium ions, a lithium metal, a lithium metal alloy, a material being capable of doping lithium, or a transition metal oxide.

The material that can reversibly intercalate/deintercalate lithium ions includes a carbon material. The carbon material may be any generally-used carbon-based negative active material in a lithium ion secondary battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbide, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ ($0<x<2$), a Si—Y alloy (where Y is an element selected from the group consisting of an alkali metal, an alkaline-earth metal, a group 13 element, a group 14 element, a transition element, a rare earth element, and combinations thereof, and is not Si), Sn, $SnO_2$, a Sn—Y alloy (where Y is an element selected from the group consisting of an alkali metal, an alkaline-earth metal, a group 13 element, a group 14 element, a transition element, a rare earth element, and combinations thereof and is not Sn), or mixtures thereof. At least one of these materials may be mixed with $SiO_2$. The element Y can be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

The binder improves binding properties of negative active material particles with one another and with a current collector. Examples of the binder include at least one selected from the group consisting of polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; metal-based materials of metal powder or metal fiber including copper, nickel, aluminum, silver, and the like; conductive polymers such as polyphenylene derivatives; or mixtures thereof.

The separator 40 includes, for example polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple layered separator.

Hereafter, the outermost electrode 50 will be described.

The outermost electrode 50 may be a positive electrode or a negative electrode.

The outermost electrode 50 includes a current collector 51, an active material layer 52 formed on one side of the current collector 51, and an inactive material layer 55 formed the other side of the current collector 51. The active material layer 52 is disposed on the side of the inner stacked electrodes, and the inactive material layer 55 becomes an outermost layer of the electrode assembly 100.

When the outermost electrode 50 is a positive electrode, the current collector 51 and the active material layer 52 are the same as the current collector 21 and the positive active material layers 22a and 22b of the above-described positive electrode 20.

When the outermost electrode 50 is a negative electrode, the current collector 51 and the active material layer 52 are the same as the current collector 31 and the negative active material layers 32a and 32b of the above-described negative electrode 30.

Figure 3:
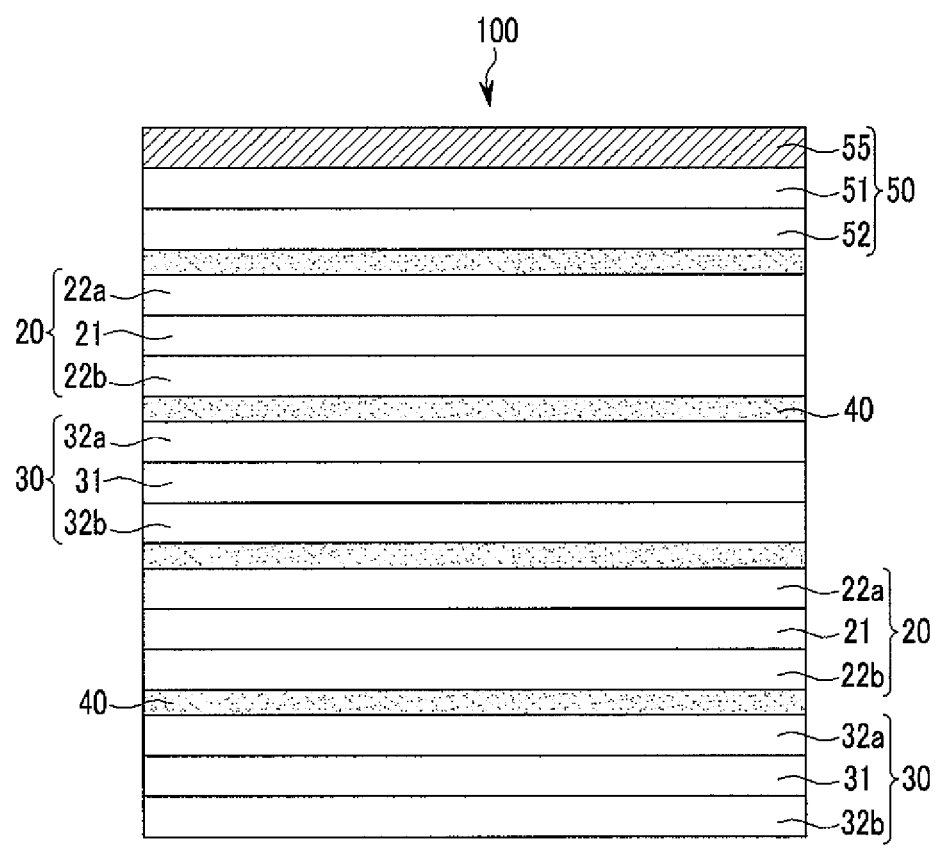
FIG. 3 is a cross-sectional view of another embodiment magnifying an 'A' portion shown in FIG. 1.

The inactive material layer 55 constitutes the lower and upper outermost layers of the electrode assembly 100 as shown in FIG. 2. However, the present embodiment is not limited to it and the inactive material layer 55 may be positioned in either lower or upper portion of the electrode assembly 100 as shown in FIG. 3.

The inactive material layer 55 includes an inactive material formed of an inorganic material, an organic material or a combination thereof which does not cause an electrochemical reaction. Herein, the inactive material is a term in opposite to the aforementioned active material.

The inactive material layer may comprise, for example, a porous inorganic material. Non-limiting examples of the porous inorganic material include carbon black, graphite, silica gel, zirconia, alumina, zeolite, ceramic powder such as silicon nitride.

The inactive material layer may comprise, for example, a porous organic material. Non-limiting examples of the porous organic material include a fluorine-based polymer, e.g., fluoropolymer, fluoroelastomer and perfluoroelastomer; elastomeric bisphenol A epoxy vinylester; vinylester resin; (meth)acrylated novolak-(meth)acrylated epoxy vinylester; hydroxyl-terminated polybutadiene resin; furfuryl alcohol resin; parylene; polyamide; polyimide; and polyphenylene sulphide.

The inactive material layer 55 may have almost the same thickness as the active material layer 52, for example, a thickness ranging from about 10 μm to about 10 mm.

According to the present embodiment, it is possible to prevent an abnormal phenomenon of a battery caused by an electrochemical side-reaction in the outermost portion of the electrode assembly by including an inactive material layer as an outermost layer of the stacked electrode assembly to thereby improve the reliability of the battery, and prevent the active material of an electrode from directly contacting the case to thereby improve the safety of the battery as well.

Also, since the inactive material layer may be moisturized with the electrolyte solution, it may supplement the electrolyte solution to the battery when the electrode shrinks or expands to thereby improve the long-term reliability of the battery.

Also, when the outermost portion of the electrode assembly is coated with an active material layer, the processing property may be deteriorated due to a rolling phenomenon of the active material positioned in the outermost layer during a process. According to the present embodiment, however, since the outermost layer is coated with the inactive material layer, the processing property may be improved.

Moreover, as the inactive material layer fixes the external shape of the electrode assembly, it is possible to protect the electrode from being bent or damaged by an external force.

While this disclosure has been described in connection with what is presently considered to be practical exemplary embodiments, it is to be understood that the present embodiments are not limited to the disclosed embodiments, but, on the contrary, is intended to cover various modifications and equivalent arrangements included within the spirit and scope of the appended claims.

What is claimed is:

1. A secondary battery comprising:
    an electrode assembly comprising inner stacked electrodes and at least one outermost electrode positioned on at least one end of the inner stacked electrodes;
    an electrolyte solution and
    a case configured to house the electrode assembly;
    wherein the at least one outermost electrode comprises a porous inactive material on only one side of the outermost electrode;
    wherein the porous inactive material consists essentially of a porous organic material that does not cause an electrochemical reaction, and
    wherein the porous inactive material contacts the electrolyte solution and is configured to supply the electrolyte solution to the battery when the electrode shrinks or expands.

2. The secondary battery of claim 1, wherein the at least one outermost electrode comprises a porous inorganic material.

3. The secondary battery of claim 2, wherein the porous inorganic material comprises at least one selected from the group consisting of carbon black, graphite, silica gel, zirconia, alumina, zeolite, ceramic powder and silicon nitride.

4. The secondary battery of claim 1, wherein the at least one outermost electrode comprises a porous organic material.

5. The secondary battery of claim 4, wherein the porous organic material comprises at least one selected from the group consisting of fluoropolymer, fluoroelastomer, perfluoroelastomer, elastomeric bisphenol, epoxy vinylester, vinylester resin, (meth)acrylated novolak-(meth)acrylated epoxy vinylester, hydroxyl-terminated polybutadiene resin, furfuryl alcohol resin, parylene, polyamide, polyimide, and polyphenylene sulphide.

6. The secondary battery of claim 1, wherein the at least one outermost electrode comprises a current collector and an inactive material layer comprising the inactive material formed on one side of the current collector, wherein the inactive material layer contacts the case.

7. The secondary battery of claim 6, wherein the at least one outermost electrode further comprises an active material layer formed on the other side of the current collector.

8. The secondary battery of claim 6, wherein the inactive material layer is positioned in either the lower or upper portion of the electrode assembly.

9. The secondary battery of claim 6, wherein the inactive material layer is positioned in both the lower and upper portion of the electrode assembly.

10. The secondary battery of claim 1, wherein the inner stacked electrodes comprise a plurality of positive electrodes and negative electrodes alternately stacked, and a separator interposed between each positive electrode and negative electrode.

11. The secondary battery of claim 10, wherein the positive electrode comprises a positive active material comprising a composite oxide including at least one of cobalt, manganese, nickel, and lithium.

12. The secondary battery of claim 10, wherein the negative electrode comprises a negative active material comprising at least one of a material that reversibly intercalates/deintercalates lithium ions, a lithium metal, a lithium metal alloy, a material capable of doping lithium, and a transition metal oxide.

13. A method of fabricating a secondary battery comprising:
    providing an electrode assembly comprising inner stacked electrodes, an electrolyte solution and at least one outermost electrode positioned on at least one end of the inner stacked electrodes; and
    housing the electrode assembly in a case;
    wherein the at least one outermost electrode comprises a porous inactive material on only one side of the outermost electrode;
    wherein the porous inactive material consists essentially of a porous organic material that does not cause an electrochemical reaction, and
    wherein the porous inactive material contacts the electrolyte solution and supplies the electrolyte solution to the battery when the electrode shrinks or expands.

14. The method of claim 13, wherein the at least one outermost electrode comprises a porous inorganic material.

15. The method of claim 14, wherein the porous inorganic material comprises at least one selected from the group consisting of carbon black, graphite, silica gel, zirconia, alumina, zeolite, ceramic powder and silicon nitride.

16. The method of claim 13, wherein the at least one outermost electrode comprises a porous organic material.

17. The method of claim 16, wherein the porous organic material comprises at least one selected from the group consisting of fluoropolymer, fluoroelastomer, perfluoroelastomer, elastomeric bisphenol, epoxy vinylester; vinylester resin, (meth)acrylated novolak-(meth)acrylated epoxy vinylester, hydroxyl-terminated polybutadiene resin, furfuryl alcohol resin, parylene, polyamide, polyimide, and polyphenylene sulphide.

18. The method of claim 13, wherein the at least one outermost electrode comprises a current collector and an inactive material layer comprising the inactive material formed on one side of the current collector, wherein the inactive material layer contacts the case.

19. The method of claim 13, wherein the at least one outermost electrode further comprises an active material layer formed on the other side of the current collector.

20. The method of claim 13, wherein the inactive material layer is positioned in either the lower or upper portion of the electrode assembly.

* * * * *